(12) United States Patent
Ballas

(10) Patent No.: US 9,358,622 B2
(45) Date of Patent: Jun. 7, 2016

(54) SINGLE SIDED INDEXABLE RAMPING MILLING INSERT AND RAMPING MILLING TOOL

(71) Applicant: Iscar, Ltd., Tefen (IL)

(72) Inventor: Assaf Ballas, Akko (IL)

(73) Assignee: Iscar, Ltd., Tefen (IL)

( * ) Notice: Subject to any disclaimer, the term of this patent is extended or adjusted under 35 U.S.C. 154(b) by 392 days.

(21) Appl. No.: 14/086,419

(22) Filed: Nov. 21, 2013

(65) Prior Publication Data

US 2015/0139743 A1  May 21, 2015

(51) Int. Cl.
*B23C 5/00* (2006.01)
*B23C 5/20* (2006.01)
*B23C 5/10* (2006.01)

(52) U.S. Cl.
CPC ............... *B23C 5/207* (2013.01); *B23C 5/109* (2013.01); *B23C 2200/0494* (2013.01); *B23C 2200/128* (2013.01); *B23C 2200/208* (2013.01); *B23C 2200/361* (2013.01); *B23C 2200/367* (2013.01); *Y10T 407/1906* (2015.01); *Y10T 407/1936* (2015.01); *Y10T 407/23* (2015.01)

(58) Field of Classification Search
CPC ............ B23B 2200/12; B23B 2200/123; B23B 2200/125; B23B 2200/126; B23B 2200/162; B23B 2200/163; B23B 2200/242; B23B 2200/243

See application file for complete search history.

(56) References Cited

U.S. PATENT DOCUMENTS

| 4,755,086 A * | 7/1988 | Stashko | B23B 27/145 407/114 |
| 5,032,050 A * | 7/1991 | Niebauer | B23B 27/045 407/114 |
| 7,189,030 B2 | 3/2007 | Sheffler et al. | |
| 8,449,230 B2 | 5/2013 | Nguyen et al. | |
| 2002/0192041 A1 | 12/2002 | Wallstrom | |
| 2008/0170919 A1 | 7/2008 | Dufour et al. | |
| 2012/0039678 A1 | 2/2012 | Nguyen et al. | |
| 2015/0139743 A1 * | 5/2015 | Ballas | B23C 5/109 407/48 |

FOREIGN PATENT DOCUMENTS

EP   0956921 A2   11/1999

OTHER PUBLICATIONS

International Search Report dated Feb. 18, 2015 issued in PCT counterpart application (No. PCT/IL2014/050915).

* cited by examiner

*Primary Examiner* — Will Fridie, Jr.
(74) *Attorney, Agent, or Firm* — Womble Carlyle

(57) ABSTRACT

A single-sided ramping milling insert for ramping operations has top and bottom surfaces and a peripheral surface which extends therebetween. The peripheral surface meets the top and bottom surfaces at respective top and bottom edges. The top edge includes two opposite side cutting edges, two opposite ramping cutting edges, two diagonally opposite raised corner cutting edges and two diagonally opposite associated lowered corner cutting edges. The lowered corner cutting edges are closer to the bottom surface than the raised corner cutting edges. The bottom edge has two diagonally opposite bottom corner edges. The lowered corner cutting edges and the bottom corner edges are convexly curved and a depression is recessed into the peripheral surface between each lowered corner cutting edge and its associated bottom corner edge, the depression configured for providing relief from a convex workpiece surface cut by the lowered corner cutting edge during ramping operations.

19 Claims, 5 Drawing Sheets

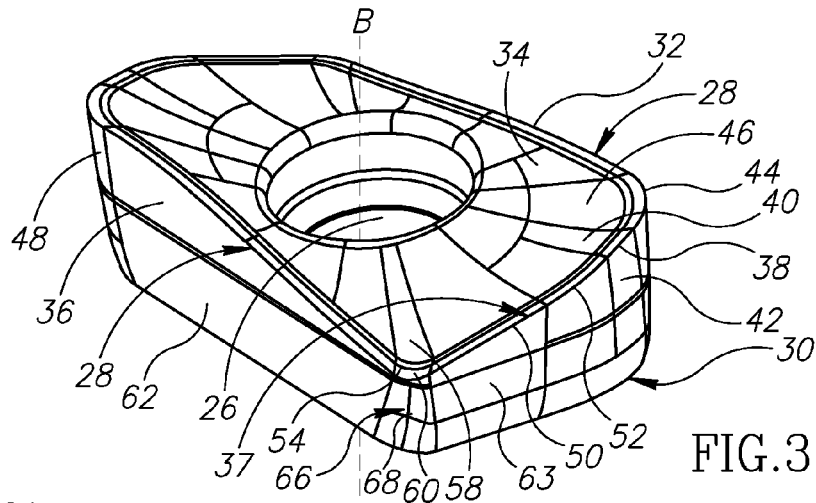
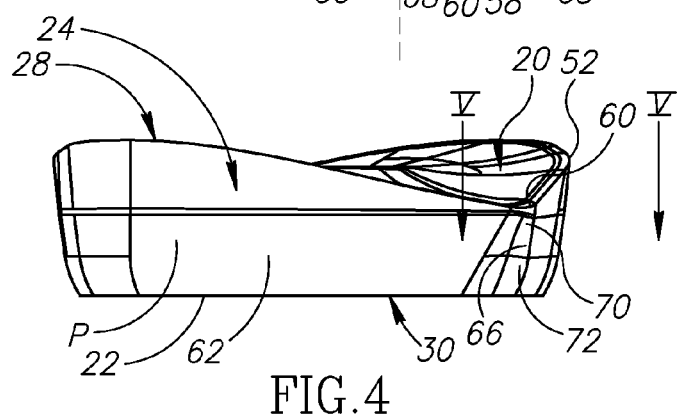
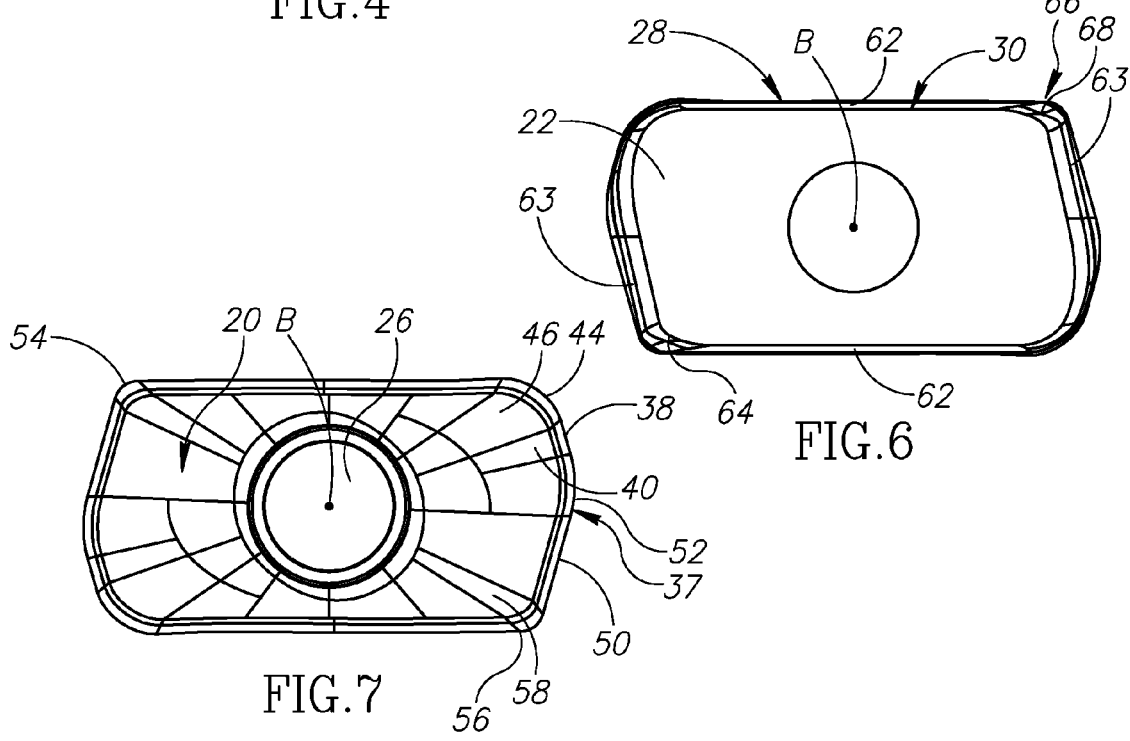

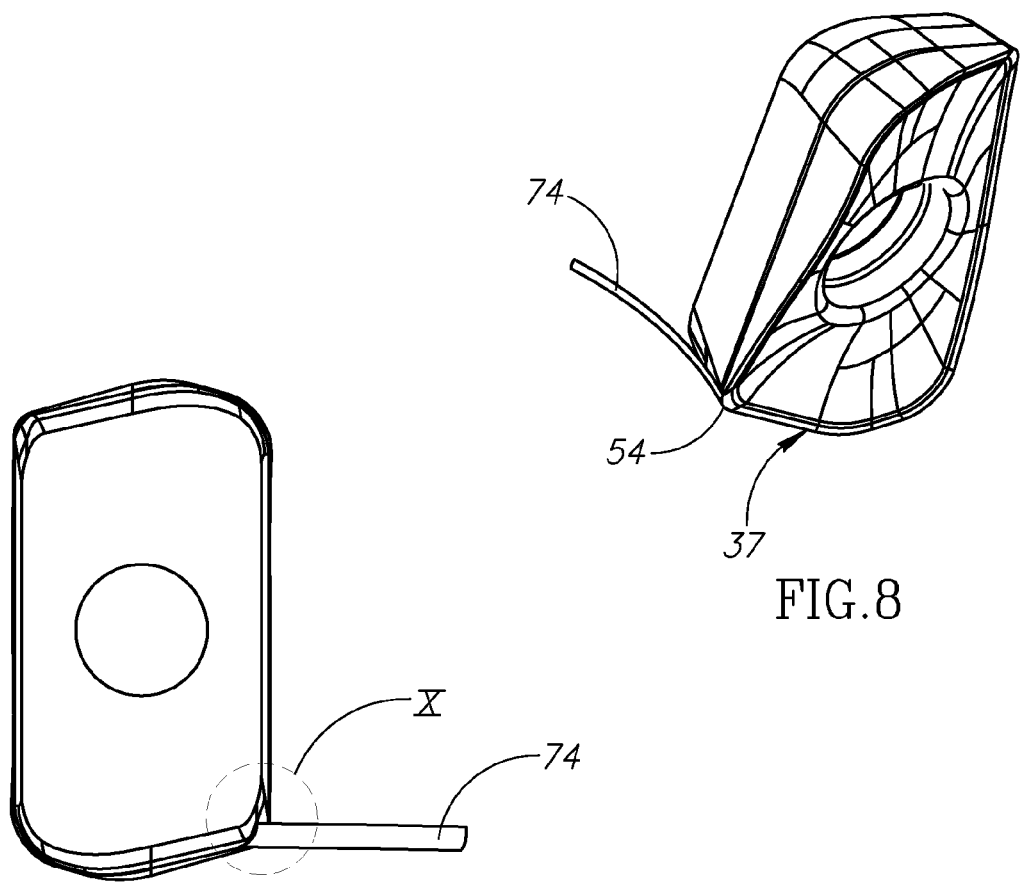
FIG.8
FIG.9
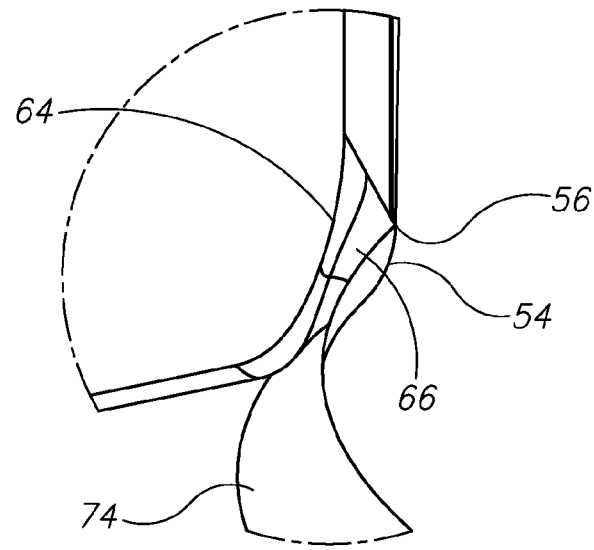
FIG.10

SINGLE SIDED INDEXABLE RAMPING MILLING INSERT AND RAMPING MILLING TOOL

FIELD OF THE INVENTION

The subject matter of the present application relates to metal cutting milling tools, specifically configured for ramping, plunging or helical interpolation operations.

BACKGROUND OF THE INVENTION

Milling tools of the field are known and disclosed, for example, in U.S. Pat. No. 7,189,030. Ramping milling tools are also known and disclosed, for example, in U.S. Pat. No. 8,449,230.

SUMMARY OF THE INVENTION

In accordance with the subject matter of the present application there is provided a single-sided indexable ramping milling insert configured for ramping operations and for mounting in a pocket of a ramping milling tool.

The insert includes top and bottom surfaces and a peripheral surface which extends therebetween and meets the top and bottom surfaces at respective top and bottom edges. The top edge includes two side cutting edges, two opposite ramping cutting edges, two diagonally opposite raised corner cutting edges and two diagonally opposite lowered corner cutting edges.

Each corner cutting edge is located between side and ramping cutting edges, and the lowered corner cutting edges is closer to the bottom surface than the raised corner cutting edges. The bottom edge includes two diagonally opposite bottom corner edges, each being associated with, and adjacent to, a respective lowered corner cutting edge.

The lowered corner cutting edges and the bottom corner edges are convexly curved; and a depression is recessed into the peripheral surface, between each lowered corner cutting edge and associated bottom corner edge, the depression configured for providing relief from a convex workpiece surface cut by the lowered corner cutting edge during ramping operations.

In accordance with the subject matter of the present application there is further provided a ramping milling tool having a rotation axis Z and comprising a tool body having a pocket, and the ramping milling insert secured in the pocket.

Any of the following features, either alone or in combination, may be applicable to any of the above aspects of the subject matter of the application:

In a plan view of the bottom surface the depression can have a concavely curved concave portion.

The depression is concave, at least in a cross-section taken along a mid plane P which is located between the top and bottom surfaces and intersects the peripheral surface.

The depression is spaced apart from both the lowered corner cutting edge and the associated bottom corner edge.

The insert can include a through insert clamping bore which opens out to the top and bottom surfaces.

The top and bottom surfaces define an upward direction, and wherein each bottom corner edge can be located underneath its associated lowered corner cutting edge.

A projection of the lowered corner cutting edge (54) in a direction parallel to the bore axis (B), can overlap at least a portion of the bottom corner edge (64)

The lowered corner cutting edges and the ramping cutting edges are configured only for ramping operations.

The insert can include exactly four corner cutting edges.

The insert can include two sub cutting edges, each connected to the ramping cutting edge and a raised corner cutting edge.

The bottom corner edges are not configured for machining.

In a plan view of the top surface, the bottom edge cannot be seen.

In a plan view of the bottom surface, both the top and bottom edges can be seen.

The bottom edge is devoid of cutting edges.

The peripheral surface includes two opposite first side abutment surfaces and two opposite second side abutment surfaces configured for abutment in a pocket of a milling tool body.

The peripheral surface and the bottom surface form a non-acute bottom edge angle α adjacent to, and along the entirety of, the bottom edge.

The ramping milling insert is secured in the pocket via a screw, and the pocket includes a pocket base surface and first and second support walls which extend therefrom. The first support wall includes a first abutment surface and the second support wall includes two, co-planar second abutment surfaces. A first side abutment surface abuts the first abutment surface, a second side abutment surface abuts the two second abutment surfaces and the bottom surface abuts the pocket base surface.

BRIEF DESCRIPTION OF THE DRAWINGS

For a better understanding of the subject matter of the present application and to show how the same may be carried out in practice, reference will now be made to the accompanying drawings, in which:

FIG. 3 is an isometric view of a ramping milling insert;

FIG. 4 is a side view of the ramping milling insert of FIG. 3;

FIG. 5 is a cross-section taken along line V-V in FIG. 4, showing a concave portion of a depression;

FIG. 6 is a bottom plan view of a bottom surface of the ramping milling insert of FIG. 3;

FIG. 7 is a top plan view of a top surface of the ramping milling insert of FIG. 3;

FIG. 8 is an isometric view of the ramping milling insert showing a trace of a workpiece cut surface during ramping operations;

FIG. 9 is a bottom plan view of the ramping milling insert and the trace of FIG. 8;

FIG. 10 is a detail view of the ramping milling insert and the trace of FIG. 9;

Figure 1:
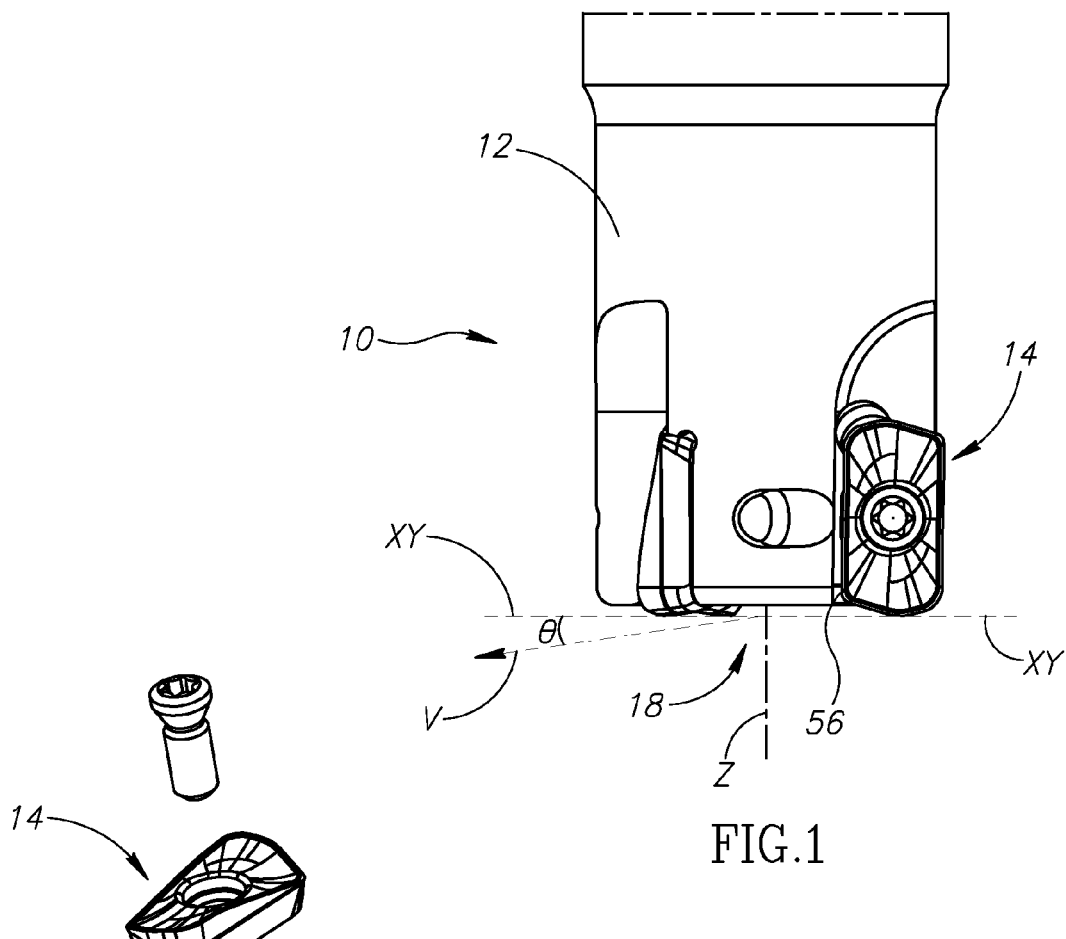
FIG. 1 is a side view of an assembled milling tool.

Where considered appropriate, reference numerals may be repeated among the figures to indicate corresponding or analogous elements.

DETAILED DESCRIPTION OF THE INVENTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific configurations and details presented herein.

Figure 2:
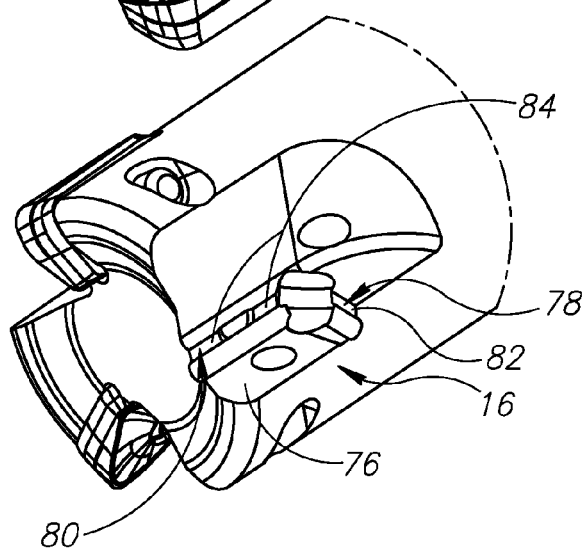
FIG. 2 is an isometric partial exploded view of the milling tool of FIG. 1.

Reference is made to FIGS. 1 and 2. A milling tool 10 capable of ramping operations has a rotation axis Z, includes a tool body 12 and can include three indexable ramping milling inserts 14 secured in pockets 16 at a tool body front end 18. The inserts 14 project from the tool body front end 18 in the rotation axis Z direction. In order to elaborate on ramping, the subject matter of the present application relates to metal machining, specifically, where the cutting tool rotates about the rotation axis Z and also advances in the direction of the rotation axis Z (outwardly away from the tool body front end 18) and advances in a face plane XY which is perpendicular to the rotation axis Z. Ramping is also known as ramp milling, or ramp-down.

Attention is drawn to FIGS. 3 to 7. The insert 14 is typically made of extremely hard and wear-resistant material such as cemented carbide, either by form-pressing or by injection molding and sintering carbide powders in a binder. The cemented carbide may be, for example, tungsten carbide. The insert 14 may be coated or uncoated. In the present example, the insert 14 is made by form-pressing.

According to the subject matter of the present application, each insert 14 is single-sided and has a top surface 20, a bottom surface 22 and a peripheral surface 24 which extends therebetween. The bottom surface 22 can be planar.

The insert 14 has a mid plane P which can be located midway between the top and bottom surfaces 20, 22 and intersects the entire peripheral surface 24. The mid plane P can be parallel to the bottom surface 20. The insert 14 can have a clamping bore 26 which passes through the top and bottom surfaces 20, 22 and the mid plane. The clamping bore 26 has a center axis B which can be perpendicular to the mid plane P. The insert 14 can have 180 degrees rotational symmetry about the center axis B. The peripheral surface 24 meets the top and bottom surfaces 20, 22 at respective top and bottom edges (28, 30). As shown in FIG. 7, in a plan view of the top surface 20, the bottom edge 30 cannot be seen. In a plan view of the bottom surface 22, both the top and bottom edges (28, 30) are seen.

Figure 11:
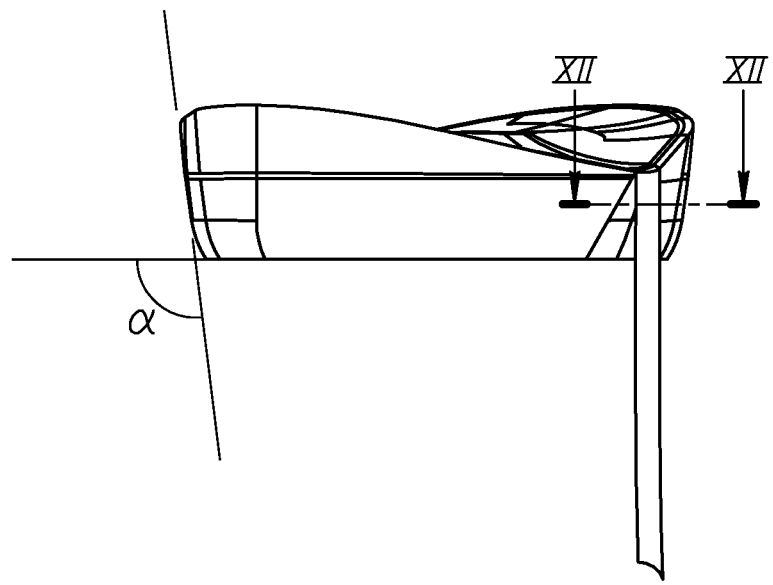
FIG. 11 is a side view of the ramping milling insert and the trace of FIG. 8.

The bottom edge 30 is devoid of cutting edges. In other words, the bottom edge 30 isn't capable of machining. Furthermore, anywhere along the bottom edge 30, the peripheral surface 24 and the bottom surface 22 (adjacent the bottom edge 30) form a non-acute bottom edge angle a (FIG. 11).

The top edge 28 can include two opposite side cutting edges 32. The side cutting edges 32 can be longer than the rest of the cutting edges, and can extend along a longitudinal direction of the insert 14. The top surface 20 includes two side rake surfaces 34 and the peripheral surface 24 includes two side relief surfaces 36. Each side cutting edge 32 is associated with a side rake surface 34 which meets a respective side relief surface 36 at the side cutting edge 32.

According to the present example the top edge 28 includes two end cutting edges 37. Each end cutting edge 37 can include a sub cutting edge 38 and a ramping cutting edge 50 connected thereto via a transition corner cutting edge 52. In the present example, the sub cutting edge 38 is configured for feed milling operations. The sub cutting edges 38 can be shorter than the side cutting edges 32. The top surface 20 can include two end rake surfaces 40 and the peripheral surface 24 can include two end relief surfaces 42. Each sub cutting edge 38 is associated with an end rake surface 40 which meets a respective end relief surface 42 at the sub cutting edge 38.

The top edge 28 further includes two, diagonally opposite, raised corner cutting edges 44. According to the present example, each raised corner cutting edge 44 is located between, and connects, the side and end cutting edges 32, 37. The raised corner cutting edges 44 are convexly curved. The raised corner cutting edges 44 are located farther from the mid plane P than any other portion of the insert 14 located on the same side of the mid plane P. At least an apex of each raised corner cutting edge 44 extends outwardly away from the peripheral surface 24 and the top surface 20 farther than any other portion of the insert 14.

The top surface 20 includes two raised corner rake surfaces 46 and the peripheral surface 24 includes two raised corner relief surfaces 48. Each raised corner cutting edge 44 is associated with a raised corner rake surface 46 which meets a respective raised corner relief surface 48 at the raised corner cutting edge 44. In milling operations, the raised corner cutting edge 44 cuts a corner, or a shoulder apex, in a workpiece.

The ramping cutting edges 50 are configured for ramping operations. Each ramping cutting edge 50 is connected, at one side, to a respective lowered corner cutting edge 54 as will be further explained below. According to the present example, each ramping cutting edge 50 is connected, at the other side, to the sub cutting edges 38 via the transition corner cutting edge 52. At least a portion of the transition corner cutting edge 52 can be configured for finishing, or wiping, operations. Each ramping cutting edge 50 can be longer than the sub cutting edge 38, and can be shorter than the side cutting edge 32.

The top edge 28 further includes two diagonally opposite lowered corner cutting edges 54. Each lowered corner cutting edge 54 is connected to the side cutting edges 32 on one side, and can be connected to the ramping cutting edges 50 at the other side thereof. The lowered corner cutting edges 54 are located closer to the mid plane P than the raised corner cutting edges 44. The lowered corner cutting edges 54 are configured for ramping operations.

In ramping operations, an upper section of the lowered corner cutting edge 54 closest to the side cutting edge 32 includes an outer-most, or maximum cutting point 56 which still "works", or cuts, the workpiece ramping. As will further be explained below, the maximum cutting point 56 is the highest (and farthest from the ramping cutting edge 50), or last, point on a lowered corner cutting edge 54 which still cuts the workpiece during ramping operations. The location of the maximum cutting point 56 is greatly determined, or influenced, by the amount of relief behind the lowered corner cutting edge 54, which, in-turn, enables (and determines) higher ramping angles, and consequently, quicker and more efficient ramping operations. In other words, the larger the relief, the farther the maximum cutting point 56 is from the ramping cutting edge 50, along the lowered corner cutting edge 54.

It is noted that the exact location of the maximum cutting point 56 on the lowered corner cutting edge 54, is also influenced by other machining variables, and can change during, and as a result of, machining. Therefore, the location indication of the maximum cutting point 56 (as shown in FIGS. 1, 7 and 10) should not be regarded as the only possible location of this point, but rather a general indication, conforming to the above definition of location.

Each lowered corner cutting edge 54 is connected to a ramping cutting edge 50. Each lowered corner cutting edge 54 is convexly curved. The top surface 20 includes two lowered corner rake surfaces 58 and the peripheral surface 24 includes two lowered corner relief surfaces 60. Each lowered corner cutting edge 54 is associated with a lowered corner rake surface 58 which meets a respective lowered corner relief surface 60 at a lowered corner cutting edge 54.

The peripheral surface 24 can include two pairs of opposite first and second side abutment surfaces 62, 63 configured for abutment with counterpart surfaces in the pocket 16. In a bottom view of the insert 14 (FIG. 6), each side abutment surface 62, 63 is located between adjacent raised and lowered corner cutting edges 48, 60.

The bottom edge 30 includes two bottom corner edges 64. Each bottom corner edge 64 is associated with a lowered corner cutting edge 54 of the top edge 28. In other words, each bottom corner edge 64 is located underneath a respective lowered corner cutting edge 54. Stated differently, a projection of the lowered corner cutting edge 54 in a direction parallel to the bore axis B, overlaps at least a portion of the bottom corner edge 64. Each bottom corner edge 64 is, advantageously, convexly curved. This strengthens the corner and the insert 14, and provides an improved support to counter machining forces. The bottom corner edges 64 are not configured for metal machining.

Attention is drawn to FIGS. 3 to 5. The insert 14 includes two depressions 66, or craters, recessed into the peripheral surface 24. The crater-like shape allows for a better relief during ramping operations. In the current disclosure, the term depression 66 is taken to mean a surface which is sunken inwards, or is situated lower, or depressed below, surfaces surrounding it. Thus, each depression 66 is formed inwardly of an imaginary surface connecting a corresponding lowered corner cutting edge 54 to its associated bottom corner edge 64. Each depression 66 includes at least a concavely curved concave portion 68. The concave portion 68 is located between top and bottom ends 70, 72 of the depression 66 (FIG. 4). As shown in FIG. 5, the depression 66 is concave in a cross-sectional view taken along the mid plane P. A depression 66 is located between each lowered corner cutting edge 54 and its associated bottom corner edge 64. In other words, each depression 66 is located between associated lowered corner cutting edge 54 and bottom corner edge 64. Also, each depression 66 is spaced apart from the lowered corner cutting edge 54 and also its associated bottom corner edge 64. The fact that the depression 66 does not reach the bottom edge 30 allows (without relinquishing relief space) for a larger bottom surface 22 to be formed, or designed, which contributes to insert 14 robustness. Each lowered corner relief surface 60 extends between the depression 66 and a respective lowered corner cutting edge 54. The depression 66 enables a larger clearance, or relief, "behind" the ramping corner cutting edge, and the lowered corner relief surface 60, which enables ramping operations at greater ramping angles, with respect, e.g., to a similar, reference insert, which does not include such a depression 66.

Attention is drawn to FIGS. 8-12, where a "trace" 74 of a cut workpiece surface is shown, after having been cut by the lowered corner cutting edge 54. The trace 74 shows only a partial representation of the workpiece surface (and its curvature) cut by the insert 14. Specifically, it shows a representation of the surface cut only by the lowered corner cutting edge 54. Due to the convex shape of the lowered corner cutting edge 54, in a cross-section (FIG. 12) with the plane P, the trace 74 is concavely curved towards the insert 14. This occurs due to the ramping and corner cutting edges rotating about the rotation axis Z. The depression 66 allows room for the trace 74 to flow freely within it, or into it, and therefore the insert 14 is properly relieved. In other words, without the existence of the depression 66, there would not be enough relief, which would lead to unwanted contact with the trace 74 (due to its outer convex curvature, which enters the "space" in the concave portion 68 of the depression 66).

Figure 12:
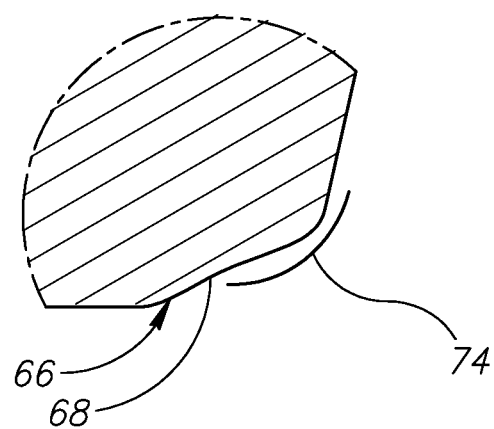
FIG. 12 is a cross-section of the ramping milling insert and the trace taken along line XII-XII of FIG. 11.

In FIG. 12 it is further shown that in a cross-section taken along the mid plane P, one edge of the cross-section of the trace 74 is adjacent the inward-most point on the concave depression 66. A ramping angle θ is typically measured between the face plane XY and a radial vector of advancement V of the tool in a workpiece (FIG. 1). The convex bottom edge 30, in conjunction with the convex lowered corner cutting edge 54, provide a more robust structure which is resistible to breakage, thus greatly improving ramping machining performance. Furthermore, the concave portion 68, as shown in FIG. 10, provides enough relief to perform ramping machining at higher angles, whilst preserving the robustness of the insert 14 (FIG. 12).

Figure 13:
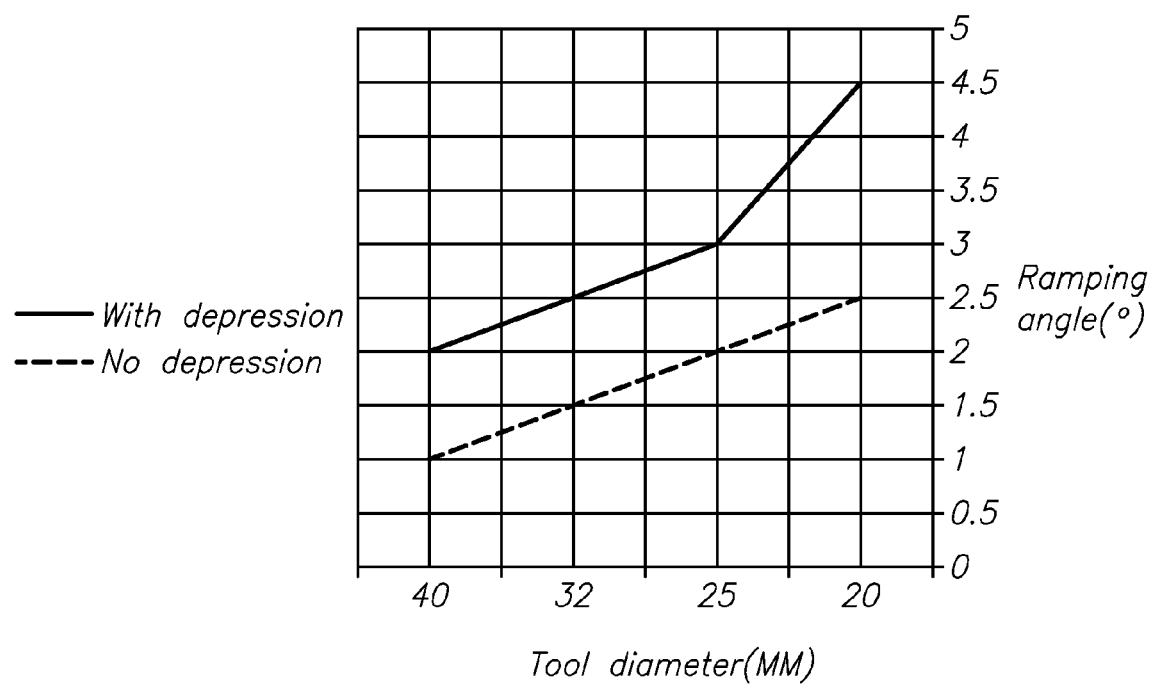
FIG. 13 shows a graph comparing ramping angles in inserts with and without a depression.

FIG. 13 shows a performance comparison at similar ramping operations conditions, between an embodiment of the insert 14 disclosed in the present application, and a reference insert (having almost identical geometry) which does not include the depression 66 behind the lowered corner cutting edge 54.

In particular, FIG. 13 shows ramping angles achieved with each insert, with various tool diameters. As shown in this figure, the depression 66 significantly increases ramping machining angles, which translates into improved performance of the milling tool 10. Furthermore, according to the non-limiting values from the above chart, the insert 14, and consequently the milling tool 10, are capable of ramping machining at ramping angles ranging from 150% to 200% compared to ramping angles of inserts without a depression 66. According to respective tool diameters, ramping angles of milling tool 10 can vary from 2 to 4.5 degrees.

According to the present example, each pocket 16 includes a pocket base surface 76, and first and second support walls 78, 80 which extend from the pocket base surface 76. The second support wall 80 can extend along the rotation axis Z. The first support wall 78 can extend in a perpendicular direction to the rotation axis Z. The base surface includes a pocket clamping bore. In the present example, the first support wall 78 includes one first abutment surface 82 and the second support wall 80 can include two, co-planar second abutment surfaces 84.

In a secured position, the insert 14 can be clamped in the pocket 16 via, e.g., a screw. The screw is located in the insert clamping bore 26 and screwed into the pocket clamping bore. The insert and screw clamping bores can be eccentric. A first side abutment surface 62 is in contact with the first abutment surface 82. A second side abutment surface 62 is in contact with the two second abutment surfaces 84. The bottom surface 22 is in contact with the pocket base surface 76.

While the present invention has been described with reference to one or more specific embodiments, the description is intended to be illustrative as a whole and is not to be construed as limiting the invention to the embodiments shown. It is appreciated that various modifications may occur to those skilled in the art that, while not specifically shown herein, are nevertheless within the scope of the invention.

What is claimed is:

1. A single-sided indexable ramping milling insert (14) configured for ramping operations and for mounting in a pocket (16) of a ramping milling tool (10), comprising top and bottom surfaces (20, 22) and a peripheral surface (24) extending therebetween and meeting the top and bottom surfaces (20, 22) at respective top and bottom edges (28, 30), the top edge (28) comprising a side cutting edge (32), an end cutting edge (37), a raised corner cutting edge (44)

located therebetween, and a lowered corner cutting edge (54) connected to the end cutting edge (37);

the lowered corner cutting edge (54) being closer to the bottom surface (20) than the raised corner cutting edge (44), the bottom edge (30) comprising a bottom corner edge (64) associated with, and adjacent to, the lowered corner cutting edge (54), wherein the lowered corner cutting edge (54) and the bottom corner edge (64) are convexly curved;

and a depression (66) is recessed into the peripheral surface (24) between the lowered corner cutting edge (54) and its associated bottom corner edge (64), the depression (66) configured for providing relief from a convex workpiece surface cut by the lowered corner cutting edge (54) during ramping operations.

2. The ramping milling insert (14) according to claim 1, wherein in a plan view of the bottom surface (20), the depression (66) has a concavely curved concave portion (68).

3. The ramping milling insert (14) according to claim 1, wherein the depression (66) is concave, at least in a cross-section taken along a mid plane (P), which is located between the top and bottom surfaces (20, 22) and intersects the peripheral surface (24).

4. The ramping milling insert (14) according to claim 1, wherein the depression (66) is spaced apart from both the lowered corner cutting edge (54) and the associated bottom corner edge (64).

5. The ramping milling insert (14) according to claim 1, wherein a projection of the lowered corner cutting edge (54) in a direction parallel to the bore axis (B), overlaps at least a portion of the bottom corner edge (64).

6. The ramping milling insert (14) according to claim 1, wherein the lowered corner cutting edge (54) and the ramping cutting edge (50) are configured only for ramping operations.

7. The ramping milling insert (14) according to claim 1, wherein the insert (14) comprises exactly four corner cutting edges (44, 54).

8. The ramping milling insert (14) according to claim 1, wherein the insert (14) further comprises a sub cutting edge (38) located between the ramping cutting edge (50) and the raised corner cutting edge (44), the sub cutting edge (38) configured at least partially for wiping operations.

9. The ramping milling insert (14) according to claim 1, wherein the bottom corner edge (64) is not configured for machining.

10. The ramping milling insert (14) according to claim 1, wherein the insert (14) comprises a through insert clamping bore (26) which opens out to the top and bottom surfaces (20, 22), the clamping bore having a center axis (B).

11. The ramping milling insert (14) according to claim 10, wherein the insert (14) has 180 degree rotational symmetry about the center axis (B).

12. The ramping milling insert (14) according to claim 10, wherein in a plan axial view of the top surface (20) along the center axis (B), the bottom edge (30) cannot be seen.

13. The ramping milling insert (14) according to claim 10, wherein in a plan axial view of the bottom surface (20) along the center axis (B), both the top and bottom edges (28, 30) can be seen.

14. The ramping milling insert (14) according to claim 1, wherein the bottom edge (30) is devoid of cutting edges.

15. The ramping milling insert (14) according to claim 1, wherein the peripheral surface (24) comprises a first side abutment surface (62) and a second side abutment surface (63).

16. The ramping milling insert (14) according to claim 1, wherein the peripheral surface (24) and the bottom surface (22) form a non-acute bottom edge angle a along the entirety of the bottom edge (30).

17. A single-sided indexable ramping milling insert (14) configured for ramping operations and for mounting in a pocket (16) of a ramping milling tool (10), comprising top and bottom surfaces (20, 22) and a peripheral surface (24) extending therebetween and meeting the top and bottom surfaces (20, 22) at respective top and bottom edges (28, 30), the top edge (28) comprising two side cutting edges (32), two ramping cutting edges (50), two diagonally opposite raised corner cutting edges (44) and two diagonally opposite lowered corner cutting edges (54);

each corner cutting edge (44, 54) being located between side and ramping cutting edges (32, 50), and the lowered corner cutting edges (54) being closer to the bottom surface (20) than the raised corner cutting edges (44), the bottom edge (30) comprising two diagonally opposite bottom corner edges (64), each being associated with a respective lowered corner cutting edge (54), wherein the lowered corner cutting edges (54) and the bottom corner edges (64) are convexly curved; and a depression (66) is recessed into the peripheral surface (24) between each lowered corner cutting edge (54) and its associated bottom corner edge (64), the depression (66) configured for providing relief from a convex workpiece surface cut by the lowered corner cutting edge (54) during ramping operations.

18. A ramping milling tool (10) having a rotation axis (Z) and comprising a milling tool body (12) having a pocket (16), and the ramping milling insert (14) according to claim 1 secured in the pocket (16).

19. The ramping milling tool (10) according to claim 18, wherein the ramping milling insert (14) is secured in the pocket (16) via a screw, and wherein the pocket includes a pocket base surface (76) and first and second support walls (78, 80) which extend therefrom; the first support wall (78) comprises a first abutment surface (82) and the second support wall (80) comprises two, co-planar second abutment surfaces (84); and wherein a first side abutment surface (62) of the cutting insert abuts the first abutment surface (82), a second side abutment surface (62) of the cutting insert abuts the two second abutment surfaces (84) and the bottom surface (22) abuts the pocket base surface (76).

* * * * *